Feb. 25, 1958
S. P. JOHNSON
2,824,481
STRESS-INDICATING FASTENER
Filed March 23, 1955
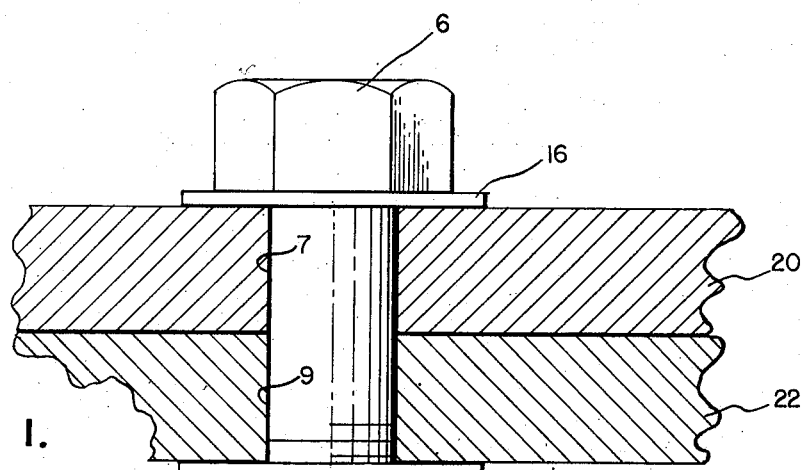
FIG. 1.
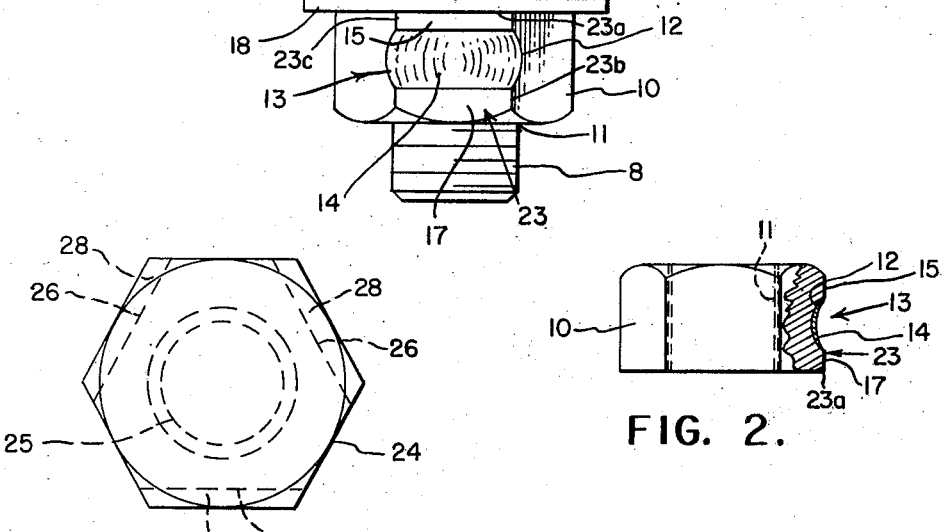
FIG. 2.
FIG. 3.
FIG. 5.
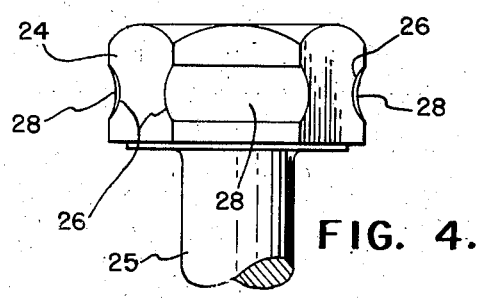
FIG. 4.
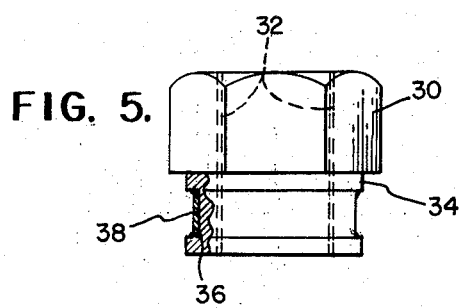
INVENTOR.
SIDNEY P. JOHNSON
BY *George Sipkin*
*B. L. Zangwill*
ATTORNEYS

United States Patent Office 2,824,481
Patented Feb. 25, 1958

2,824,481

STRESS-INDICATING FASTENER

Sidney P. Johnson, Washington, D. C.

Application March 23, 1955, Serial No. 496,360

5 Claims. (Cl. 85—62)

(Granted under Title 35, U. S. Code (1952), sec. 266)

The invention described herein may be manufactured and used by or for the Government of the United States of America for governmental purposes without the payment of any royalties thereon or therefor.

This invention relates to stress indication for fasteners; and more particularly relates to a stress-deformable fastening device provided with a stress indicator.

In fastening structural elements together with fastening means it is frequently desirable to work with the aid of a stress indicating means that provides an indication of the stress established when the fastening means is tightened. This makes it possible to provide a uniform and sufficient pressure between the various parts of the structure, if such is desired. In the past, nut and bolt stress has been indicated in a variety of ways such as, for example, by means of a pilot hole in the bolt, or by means of a torque wrench, or by means of a stress indicator washer or by measurement of the stud and bolt elongation. Certain disadvantages attend these prior art methods. For example difficulty arises in connection with obtaining tolerances in the pilot hole method, variations in friction factors seriously affect the torque wrench method, cost is a serious factor in stress indicating washer method, and both cost and time are serious factors in the bolt and stud elongation method.

It is an object of the invention to provide a fastening means provided with its own stress indicator so that no further special equipment or devices or measuring instruments are necessary for getting the stress indication.

It is another object of the invention to provide a stress indicator on a fastening device such that an indication is always available and observable without the expenditure of the time and effort required by instruments or devices of the prior art.

A further object of the invention is to provide a fastener having an integral stress-indicating means; the fastener being simple in construction, simple in operation, and inexpensive to make. Stress-indicating fasteners in accordance with the invention can be manufactured in volume with quality control so that any single batch of fasteners will provide the same predetermined stress indication. Obviously, several batches, each with its own indicator different from those of the other batches, can be made so that a selection of stress indicators can be provided.

In accordance with the present invention, fastening devices of a type which deform, or stretch, under stress are provided with or combined with a stress indicator comprising a visible layer in the form of a coating of a brittle lacquer or the equivalent. This coating, or layer, has the property of developing cracks under certain strains created in the underlying material of the fastening device. Preferably the stress indicator is in the form of a coating which may be applied in liquid form in any suitable manner before solidification. When the fastening means elongates or stretches under stress, the coating being adherent but brittle tends to adhere to the fastener but can not correspondingly stretch. Consequently, the coating cracks in a general pattern indicative of stress. This scheme is especially useful with fastening means of the bolt and nut type. With this type of screw-threaded fastening means, the desired tightness of the bolt and nut can be obtained by observation of the pattern of cracking of the stress-indicating coating thereon. An important feature of the invention resides in protecting the coating against damage by a wrench or other tool used in tightening the fastening means. To this end, the coating is preferably deposited in a recess or groove in the working surface of the fastening means.

Other objects and many of the attendant advantages of this invention will be readily appreciated as the same becomes better understood by reference to the following detailed description when considered in connection with the accompanying drawings wherein:

Fig. 1 is a side elevational view, partly in section, of an embodiment of the invention comprising bolt and nut means provided with a concave groove in an outer face thereof, the groove being coated for indicating stress;

Fig. 2 is an elevational view, partly in section, of the nut of Fig. 1, showing a cross section of the stress coating in the concave groove in one of the faces of the nut;

Fig. 3 is a plan view of a hexagonal bolt head provided with a stress indicating means in accordance with the invention;

Fig. 4 is an elevational view of the bolt of Fig. 3; and

Fig. 5 is an elevational view of a further modification embodying the invention.

Referring now to the drawings, wherein like reference numerals refer to like or corresponding parts throughout the several views, there is shown in Fig. 1 a metal bolt 6 placed through holes 7 and 9 in ship plates 20 and 22 that are to be secured together. The bolt 6 has threads 11 for receiving a hexagonal metal nut 10 by means of which the plates 20 and 22 are tightened or forced together. Conventional washers 16 and 18 are provided on the bolt 6. The nut 10 has an outer surface which includes a transverse top face that engages washer 18, a transverse bottom face, and six flat longitudinally-extending faces arranged in a hexagon for engagement by a wrench.

The nut 10 has a stress indicator indicated in its entirety by the reference 13. The stress indicator 13 consists of a concave groove 12 in one or more of the outer polygonal portion faces of the nut 10 and a paint coating 14 which covers the groove portion, being in intimate contact with the underlying metal throughout its expanse.

The coating is of a type that is brittle when dry so as to crack when stretched or elongated. The concave groove 12 is cut in a flat side, or face, of the nut 10, so to provide a top edge or border 15 and a bottom edge or border 17 paralleling the groove on both sides thereof. A tool or wrench can engage the borders 15 and 17 without contacting the coating 14. In other words, the borders 15 and 17 are protecting means for the indicator. Obviously, a wrench or other tool engaging the borders will clear the stress indicating means 13 so that tightening of the bolt and nut will not cause a scratching of the coating and thereby cause the coating to display a wrong or false indication. However the crack pattern is clearly distinguishable from scratches.

For identification purposes, in Figs. 1 and 2, a face having a stress-indicating means comprising a groove 12 and coating 14 is given the reference character 23. This face 23 is defined in part by opposite, top and bottom edges including an edge 23a, and opposite, parallel, side edges 23b and 23c. The edge 23a of face 23 is at the loaded washer 18 adjacent the plate 22; and hence this edge 23a may be called, for purposes of identification, a work-engaging edge. This edge 23a is an edge of the face, relatively closest to the work. It will be observed from the preferred embodiment of Figs. 1 and 2 that the groove 12 extends completely across the face and cuts into side edges 23b and 23c. Additionally, the groove is relatively wide and shallow, thereby occupying the transverse central portion of face 23, so as to cover a wide central area of the nut, and to be more accurately responsive to stresses in the nut 10, with the crack pattern of the coating clearly discernible by the average mechanic.

As the bolt and nut are tightened, the paint coating 14 will ultimately show cracks when the strain on the nut reaches a certain general value. This is because the metal of the nut flows plasticly a small amount but the brittle coating does not follow to the same extent. Instead the coating cracks in a pattern of fine parallel lines which are only schematically indicated in Fig. 1 by the upright curved lines spaced along the length of the stress-indicating means 13. The pattern is determined by the nature of the coating and the load on the nut, as more fully explained in the article "Stress-strain analysis from crack formations in brittle lacquer coatings," in the June 1940 issue of Product Engineering. Usually, however, the cracks will not appear in the indicator below certain stress-values. Generally, the pattern of the cracking shows the amount of stress, within fairly utilizable ranges, in the nut and thus in the bolt. By preliminary observation and calibration, the patterns for different stresses can be ascertained and represented, for example, on guiding illustrations, sketches, or charts.

Preferably, a stress-indicating nut is manufactured with a plurality of others under a controlled process. Obviously the dimensions of the nut and groove can be closely controlled, and the thickness of the painting can also be controlled in any manner. The paint or lacquer used is preferably any one having the characteristics of forming cracks when stretched; in other words the paint should be brittle or fragile. A suitable paint for stress-indication is commercially identified as "Stresscoat" and its application is further described in the circular entitled "Stresscoat," dated 1940, and published by the Magnaflux Corporation, Cambridge, Massachusetts, as their form No. S-2001.

The embodiment of Fig. 1 and Fig. 2 shows the stress-indicating means applied to the nut. However the stress-indicating means can be incorporated in the bolt as shown, for example, in Figs. 3 and 4. The bolt of Figs. 3 and 4 comprises a head 24 and a threaded stem or shank 25. The head 24 is polygonal, being provided with any desired or conventional number of flat faces. The head is a hexagonal one; and alternate faces are provided with stress-indicating means comprising a groove 26 and a coating 28. Consequently, there are three stress-indicating faces on the head 24 so that the stress indication will be visible from any angle. Each stress-indicating means is extended in a direction prependicular to the axis of the stem 25, and is preferably located in the region of maximum stress-development.

Fig. 5 illustrates another modification of a stress load-indicator. In this modification, a nut 30 is provided having an integral hexagonal head and a cylindrical portion 34 contiguous to the head. The outer longitudinal surface of the cylindrical portion 34 comprises a circumferential, rectangular-in-cross-section groove 36 which is coated with a brittle stress-indicating paint 38. The nut 30 has internal threads 32 extending axially therethrough. Preferably, the diameter of the cylindrical stress-indicating portion 34 is less than the minimum dimension of the head of the nut or the dimension from one face of the nut to its opposite face. This insures that the stress indicating portion will not be marked or otherwise marred beyond usefulness by tightening tools.

Obviously many modifications and variations of the present invention are possible in the light of the above teachings. It is therefore to be understood that within the scope of the appended claims the invention may be practiced otherwise than as specifically described.

What is claimed is:

1. A screw-threaded fastener having an outer longitudinal surface comprising a polygonal portion adapted to be engaged by a wrench, said surface comprising stress-indicating means including a relatively wide and shallow concave recessed area in the transverse central portion of one face thereof, said face having side edges and a work-engaging edge, said recessed area extending substantially to at least one of said edges, whereby said polygonal portion protects said recessed area from engagement by a wrench engaging said polygonal portion, said recessed area comprising a surface layer of a tightly-adhering brittle paint-film having the characteristic of cracking under a predetermined stress in said fastener.

2. A screw-threaded fastener as defined in claim 1 but further characterized by said recessed area extending completely across said one face from one edge of said face to the opposite edge.

3. A screw-threaded fastener as defined in claim 2 but further characterized by said recessed area being parallel to a pair of opposite edges of said face.

4. A screw-threaded fastener as defined in claim 3 but further characterized by said screw-thread fastener being a nut.

5. A screw-threaded fastener as defined in claim 3 but further characterized by said screw-thread fastener being a bolt.

References Cited in the file of this patent
UNITED STATES PATENTS

| | | |
|---|---|---|
| 134,649 | Delfer | Jan. 7, 1873 |
| 1,767,829 | Yewdall | June 24, 1930 |
| 1,778,576 | Walker | Oct. 14, 1930 |
| 2,294,897 | Ellis | Sept. 8, 1942 |
| 2,464,152 | Ralston | Mar. 8, 1949 |
| 2,546,332 | Costello | Mar. 27, 1951 |
| 2,724,964 | Singdale | Nov. 29, 1955 |